(12) United States Patent
Chan et al.

(10) Patent No.: US 7,839,775 B2
(45) Date of Patent: Nov. 23, 2010

(54) METHODS AND SYSTEMS FOR CHANNEL SENSING MULTIPLE ACCESS COMMUNICATIONS WITH MULTIPACKET RECEPTION

(75) Inventors: Douglas S. Chan, Ithaca, NY (US); Toby Berger, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 1011 days.

(21) Appl. No.: 11/376,067

(22) Filed: Mar. 14, 2006

(65) Prior Publication Data

US 2006/0221992 A1    Oct. 5, 2006

Related U.S. Application Data

(60) Provisional application No. 60/594,143, filed on Mar. 15, 2005.

(51) Int. Cl.
*H04W 4/00*      (2009.01)
*H04J 1/16*      (2006.01)
*H04J 3/14*      (2006.01)

(52) U.S. Cl. .............. 370/230; 370/235; 370/329; 370/341

(58) Field of Classification Search ............. None
See application file for complete search history.

(56) References Cited

U.S. PATENT DOCUMENTS

| | | | | |
|---|---|---|---|---|
| 4,063,220 | A | 12/1977 | Metcalfe et al. | 340/147 |
| 4,949,336 | A | 8/1990 | Hamada et al. | 370/85.2 |
| 5,485,147 | A | 1/1996 | Jaffe et al. | 340/825.5 |
| 5,719,899 | A | 2/1998 | Thielecke et al. | 375/206 |
| 6,088,324 | A * | 7/2000 | Sato | 370/203 |
| 6,157,616 | A | 12/2000 | Whitehead | 370/252 |
| 6,181,683 | B1 | 1/2001 | Chevillat et al. | 370/329 |
| 6,775,558 | B1 * | 8/2004 | Ranta et al. | 455/557 |
| 7,145,889 | B1 * | 12/2006 | Zhang et al. | 370/329 |
| 7,218,682 | B2 * | 5/2007 | Mayor et al. | 375/299 |
| 7,440,399 | B2 * | 10/2008 | Julian et al. | 370/230 |
| 2002/0167962 | A1 * | 11/2002 | Kowalski | 370/445 |
| 2004/0186907 | A1 * | 9/2004 | Wentink | 709/225 |
| 2005/0030897 | A1 * | 2/2005 | Sandhu | 370/236 |
| 2005/0141448 | A1 * | 6/2005 | Bolinth et al. | 370/329 |
| 2007/0223403 | A1 * | 9/2007 | Furuskar et al. | 370/278 |
| 2007/0237257 | A1 * | 10/2007 | Diepstraten et al. | 375/295 |

OTHER PUBLICATIONS

Ghez, S. et al. Optimal Decentralized Control in the Random Access Multipacket Channel. IEEE Trans. Auto. Contr. 34(11) Nov. 1989, 1153-1163.

Chan, D.S. et al. On the Stability and Optimal Decentralized Throughout of CSMA with Multipacket Reception Capability. Proc. of Allerton Conference on Comm. Control and Computing, 2004, 1-10.

Chan, D.S. et al. Energy Efficiency of CSMA Protocols for Wireless Packet Switched Networks. IEEE Comm. Soc. 2004, 447-452.

(Continued)

*Primary Examiner*—Chi H Pham
*Assistant Examiner*—Soon-Dong D Hyun
(74) *Attorney, Agent, or Firm*—Burns & Levinson LLP; Orlando Lopez (57) ABSTRACT

Methods and Systems for communication using carrier sense multiple access (CSMA) with multipacket reception (MPR).

60 Claims, 9 Drawing Sheets

Flowchart for terminals performing transmissions under the basic form of CSMA with MPR

OTHER PUBLICATIONS

Chan, D.S. et al. Performance and Cross-Layer Design of CSMA for Wireless Networks with Multipacket Reception. Proc. of Asilomar Conf. on Signals, Systems and Computers, 2004, 1917-1921.

Tong, L. et al. Multipacket Reception in Random Access Wireless Networks: From Signal Processing to Optimal Medium Access Control. IEEE Comm. Mag., Nov. 2001, 108-112.

Kleinrock, L. et al. Packet Switching in Radio Channels: Part I—Carrier Sense Multiple-Access Modes and Their Througput-Delay Characteristics. IEEE Trans. On Comm. 23(12), Dec. 1975, 1400-1416.

Kobayashi, T. et al. Slotted Nonpersistent CSMA with an Adaptive Array and Canceling Signal. Global Tel. Conf., Nov. 18-22, 1996. From "Communications: the Key to Global Prosperity," vol. 1, 565-569.

Tobagi, F.A. Analysis of a Two-Hop Centralized Packet Radio Network—Part I: Slotted ALOHA. IEEE Trans. Comm. COM-28(2) Feb. 1980, 196-207.

Chiu, Y. et al. OFDM Receiver Design. UC Berkeley, EE225/C/Lectures/EE225C_2000project.

\* cited by examiner

Figure 1: Flowchart for terminals performing transmissions under the basic form of CSMA with MPR Figure 2a: Flowchart for terminals performing transmissions under the cross-layer form of CSMA with MPR without continuous carrier sensing Figure 2b: Flowchart for terminals performing transmissions under the cross-layer form of CSMA with MPR with continuous carrier sensing Figure 3: Flowchart for receivers or central controllers under the cross-layer form of CSMA with MPR Figure 4: Flowchart of a preferred embodiment for terminals performing transmissions with energy detectors Figure 5: Flowchart of a preferred embodiment for terminals performing transmissions using spread spectrum techniques

METHODS AND SYSTEMS FOR CHANNEL SENSING MULTIPLE ACCESS COMMUNICATIONS WITH MULTIPACKET RECEPTION

CROSS REFERENCE TO RELATED APPLICATIONS

This application claims priority to U.S. Provisional Patent Application No. 60/594,143 Methods to Exploit Carrier Sensing and Collision Detection in Multiple Access Communications with MultiPacket Reception, filed Mar. 15, 2005 by D. S. Chan and T. Berger, the content of which is hereby incorporated by reference.

BACKGROUND OF THE INVENTION

In recent years there have been many new developments in signal processing, coding and spread spectrum techniques that facilitate receivers' ability to separate and correctly decode multiple packets transmitted simultaneously over a channel. A better physical (PHY) layer alone will improve network performance, but the overall improvement could be far greater if there is suitable cooperation with the multiple access control (MAC) layer when scheduling packet transmissions. This idea is known as cross-layer design for networks with multipacket reception (MPR) capabilities.

Cross-layer design with MPR capabilities has not been applied previously to the practical design and theoretical analysis of carrier sense multiple access (CSMA) communications and all of its variants, such as the collision-detection variant (CSMA/CD). These systems assume that their underlying PHY layers offer a reception model which considers that a transmitted packet can be successfully decoded only if it is received in the absence of any other transmitted packet. Such systems employ channel-accessing protocols that refrain from transmitting whenever the channel is sensed busy and resume if it becomes idle again. These are the principles behind the popular Ethernet (IEEE 802.3) standard for local area networks (LANs). In these systems, the channel is the common wire medium—usually a coaxial cable or in recent years perhaps a fiber optic line—connecting each station in the network. By sensing the signal level on the wire, stations become aware of when another station already has started transmission.

Throughout the 1980s researchers began to analyze MAC performance for PHY layers using MPR methods, including spread spectrum techniques and showed that such PHY layers typically outperform those of the collision channel model. However, these ideas have not been applied. For wired systems, this is evident in the IEEE 802.3 standard for different transmission mediums, in the literature and in the patent literature. Spread spectrum techniques have been used in some fiber optic networks, but they have not been used in conjunction with other network communication techniques.

In the widely adopted IEEE 802.11 wireless LAN (WLAN) standards, first ratified in 1999, CSMA was chosen as the MAC layer's access method. In order to combat narrowband interference in the unlicensed radio-bands where these standards and other RF applications co-exist, spread spectrum or orthogonal frequency division multiplexing (OFDM) techniques are employed in the PHY layer. The 802.11 standards have opted to use these techniques for mitigating interference among nearby WLANs whose chosen channel bandwidths partially or wholly overlap. All of these standards, and therefore the equipment built to be compliant with them, still treat the underlying PHY layer as a collision channel. This has also been the case to date for non-standards-compliant CSMA-based networks.

SUMMARY OF THE INVENTION

In one embodiment the method of this invention for information over a communication channel includes the steps of determining channel state information, deciding a manner in which to transmit over the communication channel based on the channel state information, the manner in which information is transmitted over the channel enabling multiple simultaneous transmissions to be present in the channel, transmitting information over the channel, and determining whether information was successfully transmitted.

Embodiments of a method for receiving information over a communication channel, where multiple simultaneous transmissions can be present in the channel (this is also referred to as multi-packet reception, MPR) and of systems that implement the methods of this invention are also disclosed.

For a better understanding of the present invention, together with other and further needs thereof, reference is made to the accompanying drawings and detailed description and its scope will be pointed out in the appended claims.

DETAILED DESCRIPTION OF THE INVENTION

Methods and systems for transmitting and receiving information over a communication channel, where multiple simultaneous transmissions are possible over the communication channel (also referred to as multi-packet reception, MPR) are disclosed herein below.

The MPR capability refers to any transmission method that allows a receiver to be able to separate and decode the signals sent simultaneously by multiple transmitters. The decoding can be error-free or with a feasibly low level of error, and it can be combined with forward error correction coding. Methods for achieving MPR capability include: (i) space-time coding, (ii) multiple input multiple output signaling, (iii) spread spectrum modulation, (iv) frequency hopping, (v) multiple access coding, and (vi) combinations thereof.

Due to the time needed for signal propagation in the communications medium, changes in the channel's transmission properties may not be reflected at a terminal's location instantaneously. However, such signal changes always will have arrived at every station after the system's maximum signal propagation delay, which equals the speed of signal propagation multiplied by the maximum separation distance between any two terminals in the system at least one of which can transmit. Therefore, in the method of this invention, transmission is performed in accordance with the value of the maximum signal propagation delay.

The manner in which the terminals conduct their transmissions can be either asynchronous or synchronous. For the latter case, time is partitioned into slots and terminals can initiate transmissions at each slot's boundary; this is called a slotted-time system. (When a node has a packet to send, it waits until the start of the next slot to send. This requires synchronization.) If the slot duration is chosen to be at least the maximum propagation delay, then channel activities initiated at the beginning of each slot are reflected at all the terminals by the start of the next slot. Detection and estimation techniques that are appropriate to whether the transmission method is asynchronous or is synchronous must be employed at the receiver.

Figure 1:
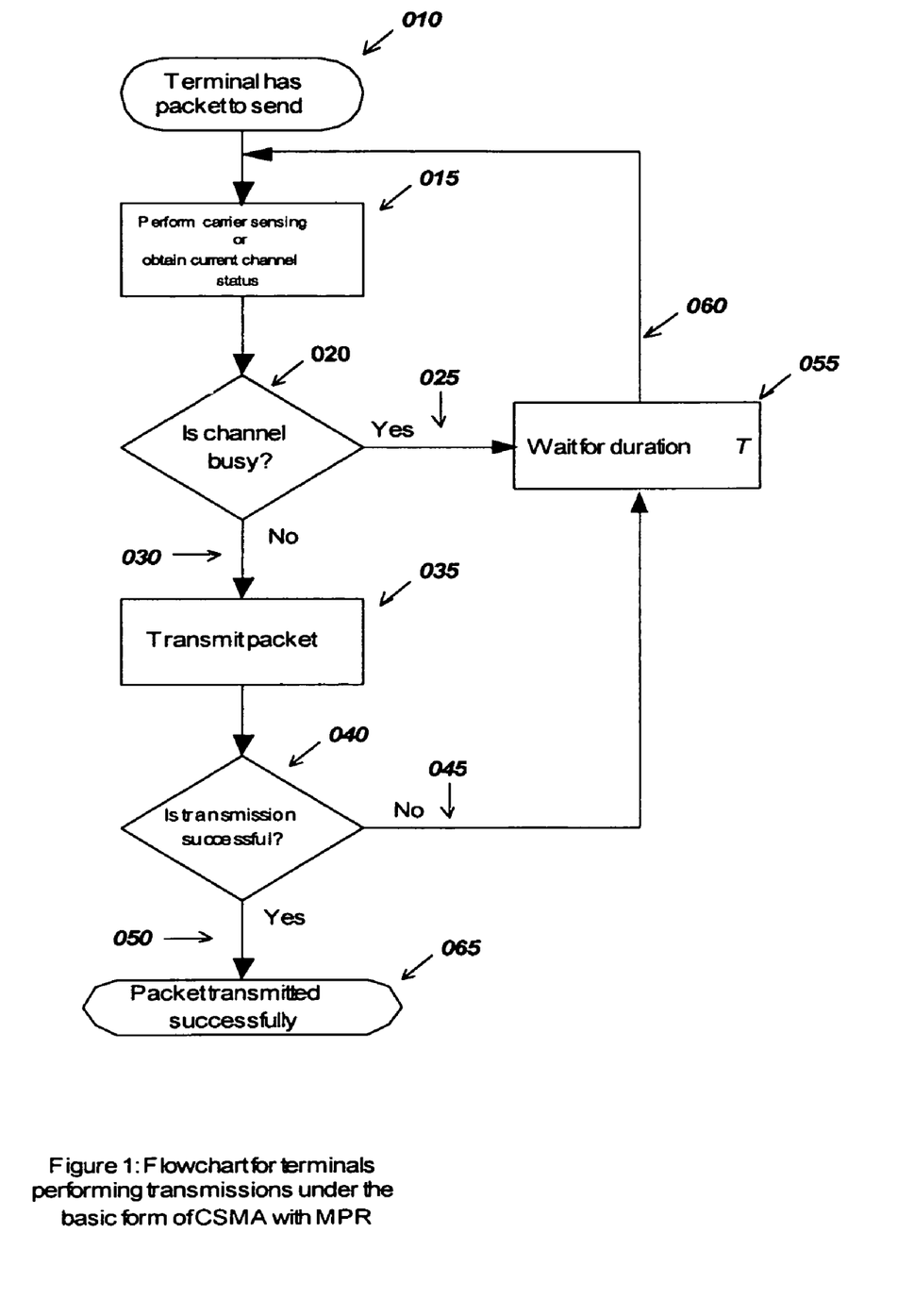
FIG. 1 is a schematic flowchart representation of an embodiment of the method of this invention for transmitting information.

FIG. 1 illustrates the invention in its basic form. It is a flowchart of the transmission operations for each terminal in the system. When a terminal has a packet to send 010, channel sensing (channel sensing, as used herein, can include carrier sensing) is performed (FIG. 1, step 015) to determine the state of the channel. If the terminal is monitoring the channel continuously, the state of the channel at the current time is used. A decision as to whether or not the terminal will transmit at this time is computed (FIG. 1, step 020). If the channel is sensed to be idle (FIG. 1, step 030), the terminal will transmit its packet (FIG. 1, step 035). If the channel is sensed busy (FIG. 1, step 025), the terminal performs a backoff, i.e. transmits after waiting a duration T (FIG. 1, step 055), which can be determined via a method suitable for the system, such as (i) randomly generated, (ii) calculated based on the history of channel activities, (iii) calculated based on the outcomes (i.e., successes and failures) of previous transmission attempts, or (iv) a combination of these methods. After backing off, the terminal repeats the above channel sensing process (FIG. 1, step 060) until the channel is sensed idle (FIG. 1, step 030).

After each transmission, the terminal determines whether its transmission was successful or not (FIG. 1, step 040). This can be achieved via any of a multiplicity of well-known methods, including a centralized acknowledgement or feedback mechanism, or observations via the channel of other terminals' transmission activities. A successfully transmitted packet (FIG. 1, step 065) means that the receiving terminal(s) (i.e., the receiver(s) of the system) have decoded the data in the packet correctly, possibly amid other simultaneous transmissions. If the transmitted packet is not successful (FIG. 1, step 045), the terminal will perform a backoff of duration T and repeat (FIG. 1, step 060) the above channel sensing and transmit process until the packet is transmitted successfully (FIG. 1, step 065). It is possible that the backoff duration generated is zero; in that event, duration T at the waiting time module (FIG. 1, step 055) will be given a value of zero. If the transmitted packet is successful (FIG. 1, step 050), the process of performing a packet transmittal is completed (FIG. 1, step 065).

The difference between the basic form of the invention (FIG. 1) and existing CSMA-based technologies is that the invention allows multiple simultaneous transmissions to be present in the channel, as facilitated by the MPR ability in the PHY layer. Previously disclosed CSMA-based schemes consider a transmission to be corrupted, and hence in need of subsequent retransmission, whenever it is in the presence of one or more other transmissions.

As discussed above, the basic CSMA form of the invention does not fully exploit the PHY layer's MPR ability. The cross-layer form of the invention can better exploit channel sensing. The cross-layer form lets new transmissions begin in an already busy channel as long as the number of transmissions currently in progress does not exceed the channel's MPR-enhanced capacity.

Figure 2A:
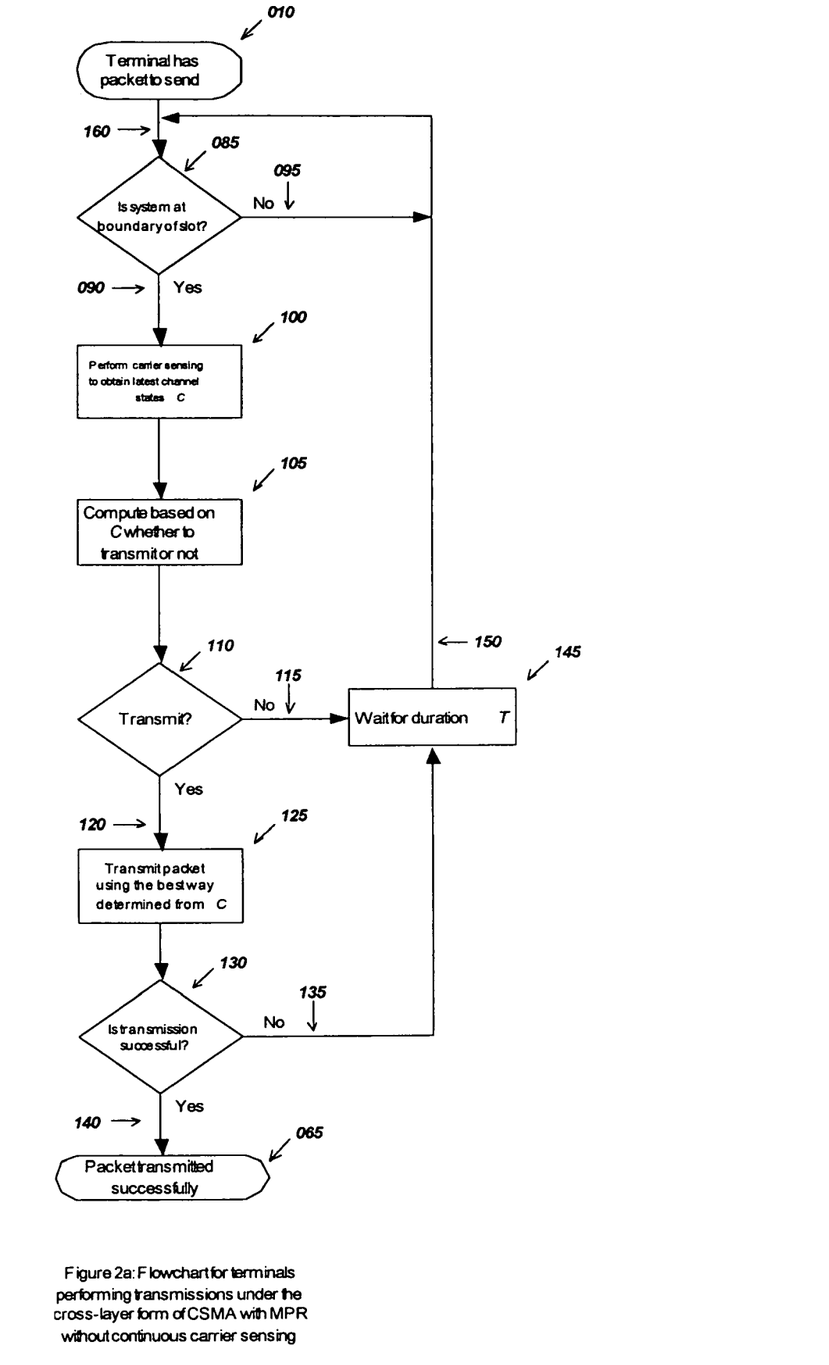
FIGS. 2*a*, 2*b* are schematic flowchart representations of another embodiment of the method of this invention for transmitting information.
Figure 2B:
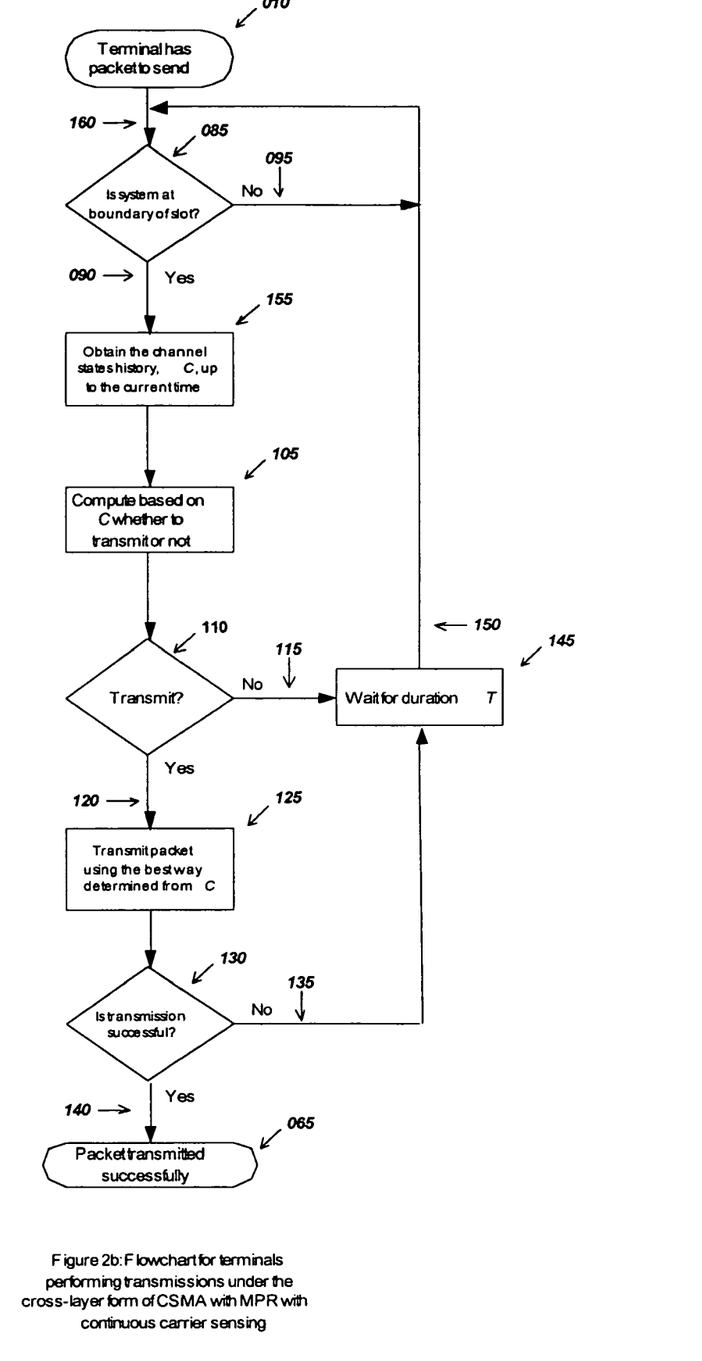

Flowcharts for the cross-layer form of the invention are given in FIGS. 2a, 2b. FIG. 2a shows the algorithm for terminals that do not monitor the channel continuously. In this embodiment whenever the terminal has a packet to send (FIG. 2a, 2b, step 010), it performs channel sensing at that time (FIG. 2a, 100) to obtain the latest channel state denoted by C. FIG. 2b shows the cross-layer form with continuous channel monitoring, in which case the terminal has a history of the channel's states which it references 155 whenever it has a packet that needs to be sent (FIG. 2a, 2b, step 010). Obviously, storing the complete history of the channel states would require significant memory resources, thus depending on the system's properties, a terminal may store channel states up to only a certain point of time in the past.

If the communications network adopts a slotted-time system, then whenever a terminal wishes to transmit, it will first ascertain whether the timing of the system is at the boundary of a slot (FIGS. 2a, 2b, step 085). If so (FIGS. 2a, 2b, step 090), the terminal will continue with the rest of the activities as described above; if not (FIGS. 2a, 2b, step 095), it will initiate this process only at a slot boundary. For systems that do not use slotted-time, the associated flowcharts can be obtained via removing the check slot boundary module (FIGS. 2a, 2b, step 085) and leads 090 and 095, and connecting lead 160 directly to the perform channel sensing module (FIG. 2a, step 100) or to the obtain channel states module (FIG. 2b, step 155).

The principal difference between the cross-layer form and the basic form of the system is that, even when the channel is busy, based on the collected channel state information, C, the terminal will compute (FIGS. 2a, 2b, step 105) whether to transmit or not (FIGS. 2a, 2b, step 110). The decision is based on the channel's transmission statistics at the time and the underlying MPR specifications. For the case where channel-monitoring is continuous, the history of the channel's states can also be taken into account for this computation. Note that the basic form of the invention is a special case of the cross-layer form in which no terminal begins transmission if the channel already is carrying any traffic at all.

Whenever a terminal decides to transmit (FIGS. 2a, 2b, step 120), it will transmit its packet in the best possible manner (FIGS. 2a, 2b, step 125) based on the information deduced from C, so that the invention exploits not only the system's MPR ability but also the channel conditions. For example, if the channel's path gain information or fading properties are obtained during channel sensing, a terminal can adjust how its transmission is performed so that the chance of success is improved. Or, for example, if the noise level present on the channel is high, the transmission power could be boosted; otherwise, the terminal can conserve energy by using a lower transmit power level.

The terminal may decide not to transmit at all at this time (FIGS. 2a, 2b, step 115) if the channel is already being used at close to capacity or channel conditions are unfavorable. In that case, the terminal can perform a backoff of duration T (FIGS. 2a, 2b, 145) after which (FIGS. 2a, 2b, step 150) it repeats the channel-sensing process. The backoff duration T may now also be determined by the channel conditions along with the channel usage and, in the continuous channel-monitoring case, their histories as well. In some systems, if the terminal decides not to transmit, it is also not necessary for the terminal to perform a randomly selected backoff. Rather, it can monitor the channel continuously (i.e., with T=0 in wait duration module 145) and transmit when more favorable conditions are observed.

The terminal performs its transmission based on channel states including one or a combination of the following:

a. Whether the channel is currently busy or not;
b. The number of terminals currently occupying the channel;
c. The number of terminals currently occupying the channel as compared to the channel's capacity;
d. The specifics of the transmissions used by the terminals currently occupying the channel, including one or a combination of the following:
   i. The frequency bands in which current transmissions are occurring;
   ii. The spreading codes the currently transmitting terminals are using;
e. The level of noise interference and other channel impairments;
f. Outcomes of prior transmission attempts;
g. The number of terminals present in the system;
h. The projected or known fixed traffic rate.

The criterion for a transmitted packet to be considered as successful in the cross-layer form (FIGS. 2a, 2b, step 130) may differ from that in the basic form (FIG. 1, 040). Certainly it will require the receivers to be able to decode the packet correctly, possibly amid other simultaneous transmissions. Since a packet's duration may now span across increased changes in channel conditions, and since a packet is successfully received only if every part of it is successfully received, in a further alternative forward error correcting (FEC) codes can be used to recover data correctly despite some subslot failures.

The terminal determines whether its transmission was successful or not (FIGS. 2a, 2b, step 130) with the same methods as in the basic form of the invention discussed above. If the transmitted packet is not successful 135, the terminal performs a backoff (FIGS. 2a, 2b, 145) and repeats the above channel sensing and transmit process until the packet is transmitted successfully (FIGS. 2a, 2b, step 065). As in the basic form, it is also not necessary that a backoff be performed at this stage, depending on the settings of the system; not backing off corresponds to setting the wait duration T 145 to zero. If the transmitted packet is successful (FIGS. 2a, 2b, step 140), the process of performing a packet transmittal is complete (FIGS. 2a, 2b, step 065).

Figure 3:
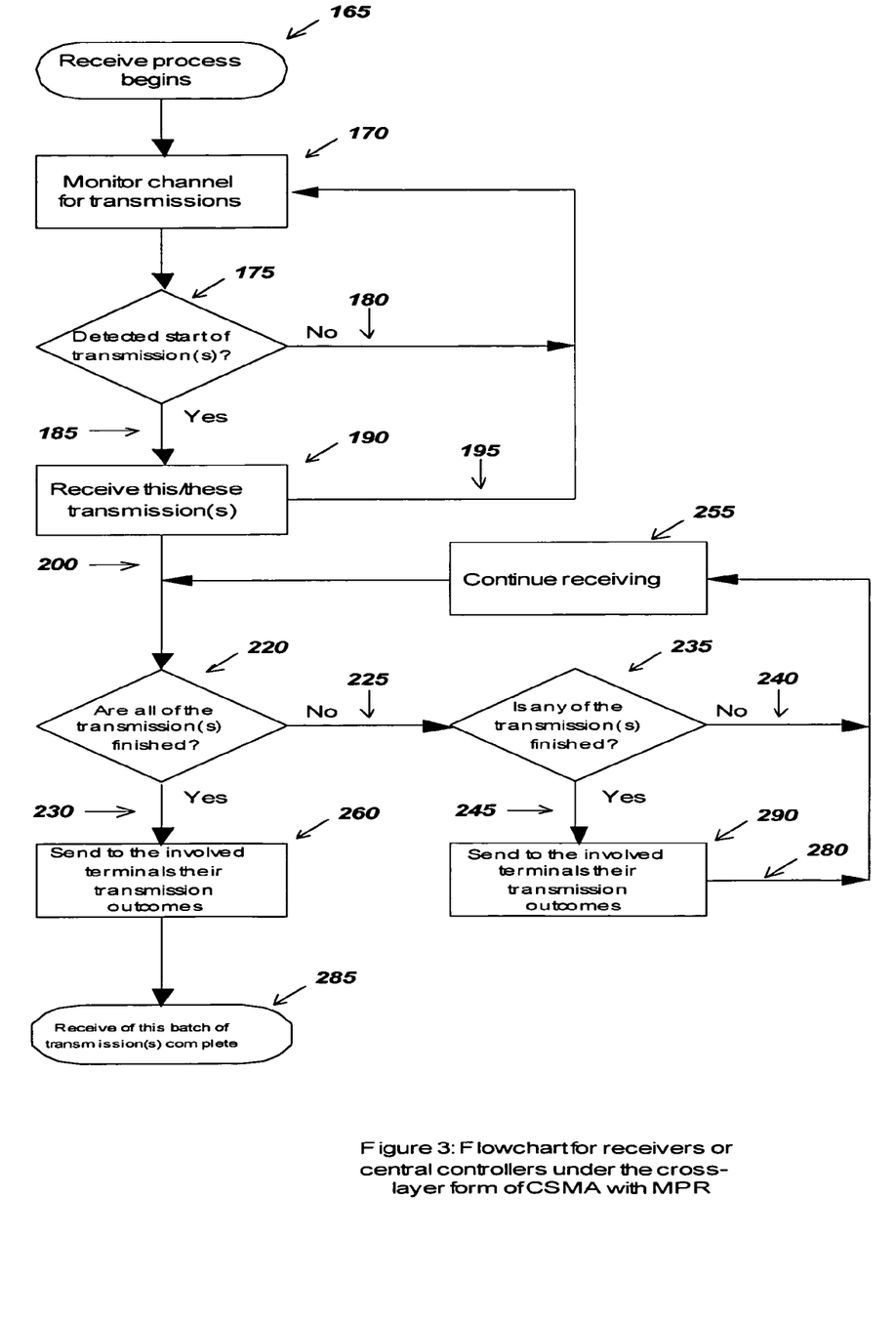
FIG. 3 is a schematic flowchart representation of an embodiment of the method of this invention for receiving information.

The flowchart for the process of receiving a transmitted packet for the cross-layer form is given in FIG. 3. After this receive process begins (FIG. 3, step 165), the receiver will start monitoring the channel for transmissions (FIG. 3, step 170) and decide whether one or more transmissions have begun (FIG. 3, 175). This can be achieved, for instance, by detecting an increase of signal energy in the channel. If no transmissions are detected yet (FIG. 3, 180), the receiver will continue to monitor the channel for them. If it is detected that one or more transmissions are starting (FIG. 3, 185), then the receiver will begin to receive these transmissions (FIG. 3, 190). The exact mechanism for receiving transmissions will depend on the MPR technique employed in the system's PHY layer and is accomplished via an appropriate receiver structure. The receiver will also return to monitor the channel for subsequent transmissions (FIG. 3, 195). Because of the paths 180 and 195 that feed back to the channel monitor 170, the receiver is constantly monitoring the channel for transmissions. Therefore, if a subsequent transmission is detected, receive procedures concurrent to the existing ones will be started for these later transmissions.

Transmittal of acknowledgement notifications to relevant terminals can be performed via a mechanism that is appropriate for the system, taking into account the MPR technique that is employed.

During the receiving procedure the receiver will also continually determine whether or not all of the transmissions have finished yet 220; this concerns only the batch of transmissions which were detected to have started at the same time in detect transmissions module 175 and for which the receive procedure 190 was started. If they are all finished 230, and if the receiver is responsible for providing feedback to the terminals, then the receiver will send acknowledgements 260 to the involved terminals informing them of their transmissions' outcomes. Thereupon, the receive process initiated for this batch of transmissions is then complete 285. However, if there are still unfinished transmissions 225, as with the case of packets that are not of a uniform length, the receiver will determine if any of the transmissions from this batch have completed 235. If none of them is finished yet 240, the receiver continues receiving these transmissions 255. But if some of them are already finished 245, and if the receiver is responsible for providing feedback to the terminals, then the receiver will send acknowledgements to the involved terminals 290. After this 280, the receiver continues to receive the rest of these transmissions 255.

Two embodiments of the invention are now described and illustrated by the accompanying drawings. It is understood that modifications can be made to these embodiments and that cognate embodiments exist that also are contained within the scope and spirit of the present invention. Therefore, the present invention are by no means limited to the descriptions of these two embodiments.

Figure 4:
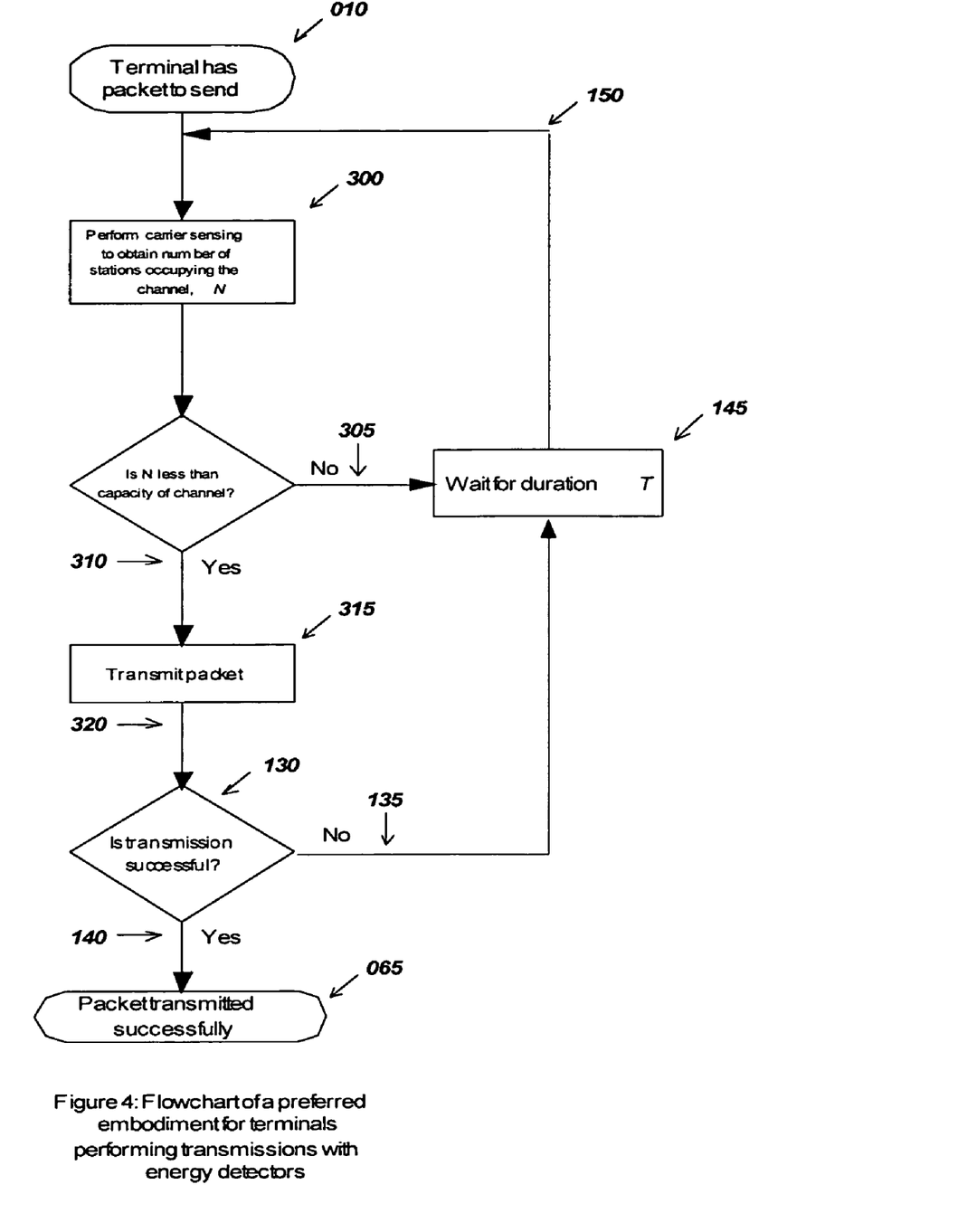
FIG. 4 is a schematic flowchart representation of yet another embodiment of the method of this invention for transmitting information.

A cross-layer over MPR embodiment is illustrated in FIG. 4. In this embodiment, each terminal is assigned a unique spreading code that allows correct decoding of its packet as long as the total number of users transmitting simultaneously is less than or substantially equal to $n^*$, where $1 \leq n^* < M$ and M is the total number of terminals in the system. (In other words, the channel's capacity is $n^*$.) This embodiment represents many spread spectrum systems used in practice in which multiuser detection can perform satisfactorily only when the SIR (signal to interference ratio) is below a certain level.

Appropriately, in this embodiment the terminals are equipped with energy detectors that can form an estimate N of the number of terminals transmitting over the channel. During channel sensing, each terminal forms its estimate N from its received signal energy 300. As long as a terminal's N is less than $n^*$ 310, then that terminal can start transmission 315. But if N is greater than $n^*$ 305, then the terminals will backoff for duration T 145, as described above. Backing off is not necessarily required though, and the terminal can return immediately 150 to check on the channel's occupancy 300 until N is less than $n^*$, i.e. T can be effectively of zero duration. The rest of the operations of this embodiment are the same as that of the cross-layer form described by FIG. 2b.

Figure 5:
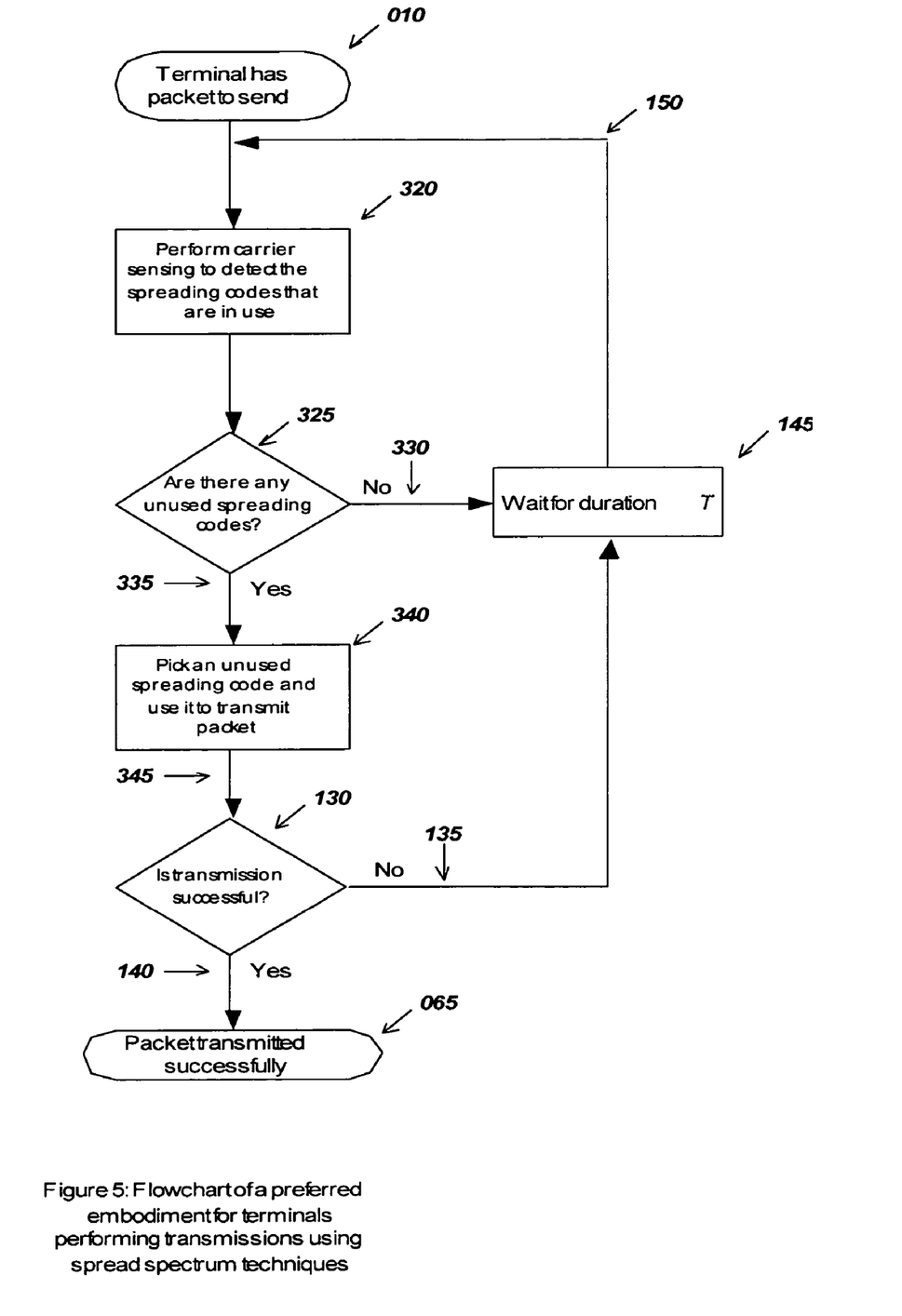
FIG. 5 is a schematic flowchart representation of a further embodiment of the method of this invention for transmitting information.

In another embodiment, illustrated in FIG. 5, each terminal is equipped with a receiver which can distinguish the spreading codes that are currently in use. When a terminal is ready to transmit its packet, it senses the channel to see which spreading codes currently are being used 320. From this information, a terminal can decide whether to transmit or not

325. Terminals will do so if there are unused spreading codes 335; they can also wisely choose codes not currently in use to effect said transmissions 340. But if there are no unused spreading codes 330, the terminals will back off for duration T 145, as described above. Again, backing off is not necessarily required, and the terminal can return immediately 150 to monitor the spreading codes being used on the channel, i.e. T can be effectively of zero duration. The rest of the operation of this embodiment is the same as that of the cross-layer form described by FIG. 2b.

It should be noted that other embodiment are also possible, such as, but not limited to, embodiments in which channel estimation is performed in order to obtain the channel state information (see for example, L. Tong, Q. Zhao and G. Mergen, "Multipacket Reception in Random Access Wireless Networks: From Signal Processing to Optimal Medium Access Control," IEEE Comm. Magazine, vol. 39, no. 11, pp 108-112, 2001, which is incorporated by reference herein, and Yun Chiu, Dejan Markovic, Haiyun Tang, Ning Zhang, OFDM Receiver Design, available at bwrc.eecs.berkeley.edu/Classes/EE225C/Lectures/EE225C_2000projects.pdf, which is incorporated by reference herein).

Figure 6:
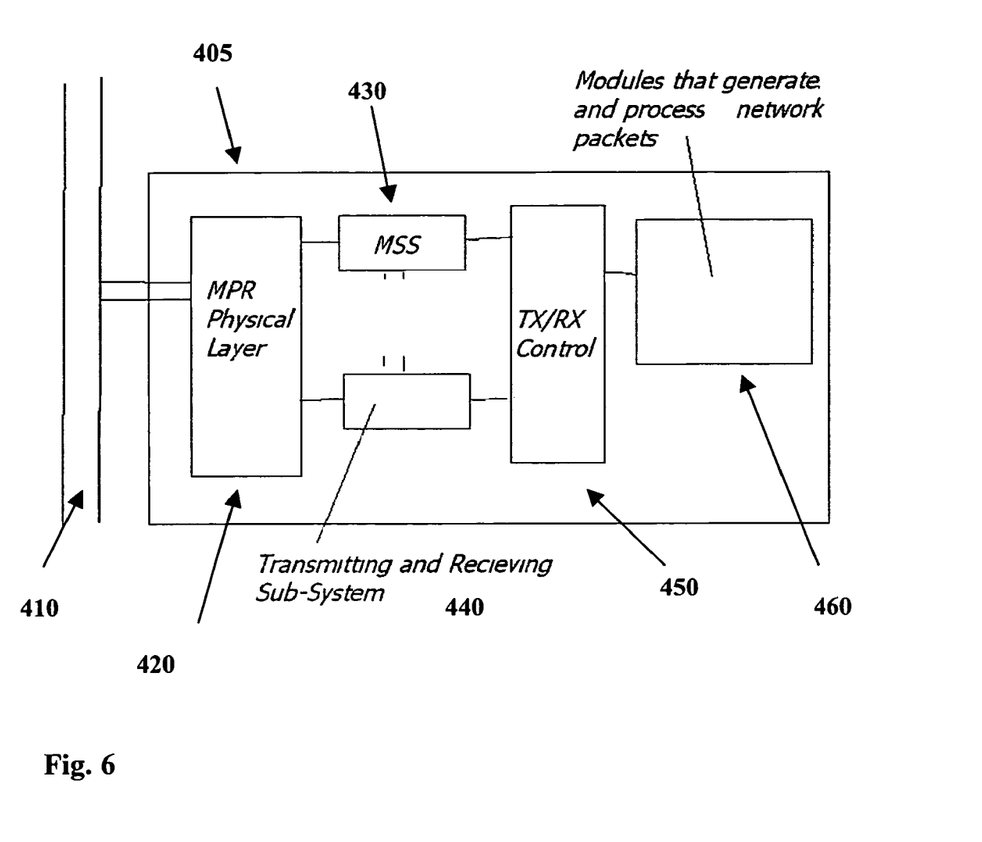
FIG. 6 is a schematic block diagram representation of an embodiment of the transmitting system of this invention.

An embodiment of the transmitting system of this invention is shown in FIG. 6. Referring to FIG. 6, the embodiment of the transmitting system of this invention shown therein includes a receiving/transmitting subsystem 440, a monitoring subsystem 430, both of which are capable of accessing the communication channel 410 through a physical layer 420 and a transmitter/receiver control subsystem 450 capable of determining a manner in which to transmit over the channel based on the channel state information and of determining whether information was successfully transmitted, the transmitter/receiver control subsystem enabling multiple simultaneous transmissions to be present in the communication channel. A module 460 generates and processes network data packets that are transmitted by the transmitting/receiving subsystem 440 of the control subsystem 450. The monitoring subsystem 430 is capable of sensing the communication channel 410 and of obtaining channel state information. The transmitter/receiver 440 and the monitoring subsystem 430 can be, in one embodiment, but are not limited to, similar to subsystems use in CSMA without MPR (see, for example, U.S. Pat. Nos. 6,157,616, and 6,181,683, both of which are incorporated by reference herein, and L. Kleinrock and F. Tobagi, "Packet Switching in Radio Channels: Part I—Carrier Sense Multiple-Access Modes and Their Throughput-Delay Characteristics," IEEE Trans. Comm., vol. 23, pp. 1400-1416, 1975, also incorporated by reference herein; see also D.S. Chan, T. Berger and L. Tong, "On the Stability and Optimal Decentralized Throughput of CSMA with Multipacket Reception Capability," Proc. of Allerton Conference on Comm., Control, and Computing, 2004, and D.S. Chan and T. Berger, "Performance and Cross-Layer Design of CSMA for Wireless Networks with Multipacket Reception Capability," Proc. of Asilomar Conference on Signals, Systems and Computers, 2004, both of which are also incorporated by reference herein). The control subsystem 450 implements the methods of this invention for transmitting information, as disclosed hereinabove, in a protocol for transmission enabling MPR.

In one embodiment, the transmitter/receiver subsystem 440 includes a slotted-time transmitter sub-system. In that embodiment, the transmitter/receiver control subsystem 440 is capable of ascertaining a timing of transmission in relation to a timeslot. (Exemplary Slotted-time transmitter subsystems can be, but are not limited to, similar to systems described in Tobagi, F. Analysis of a Two-Hop Centralized Packet Radio Network—Part I: Slotted ALOHA, IEEE Transactions on Communication, Volume 28, Issue 2, Date: February 1980, Pages: 208-216, incorporated by reference herein, and in Kobayashi, T.; Sugihara, A.; Enomoto, K.; Sasase, Slotted nonpersistent CSMA with an adaptive array and canceling signal, Global Telecommunications Conference, 1996. GLOBECOM '96. 'Communications: The Key to Global Prosperity, Volume 1, Date: 18-22 November 1996, Pages: 565-569 vol. 1, also incorporated by reference herein.)

In one embodiment, the transmitter/receiver subsystem 440 is capable of receiving transmission outcome determinations.

In one embodiment, the transmitter/receiver subsystem 440 is capable of transmitting packets of different lengths. In one instance, the physical layer 420 comprises wireless access to the communication channel 410. It should be noted that other instances of the physical layer 420, such as, but not limited to, wired systems are also within the scope of this invention.

Figure 8:
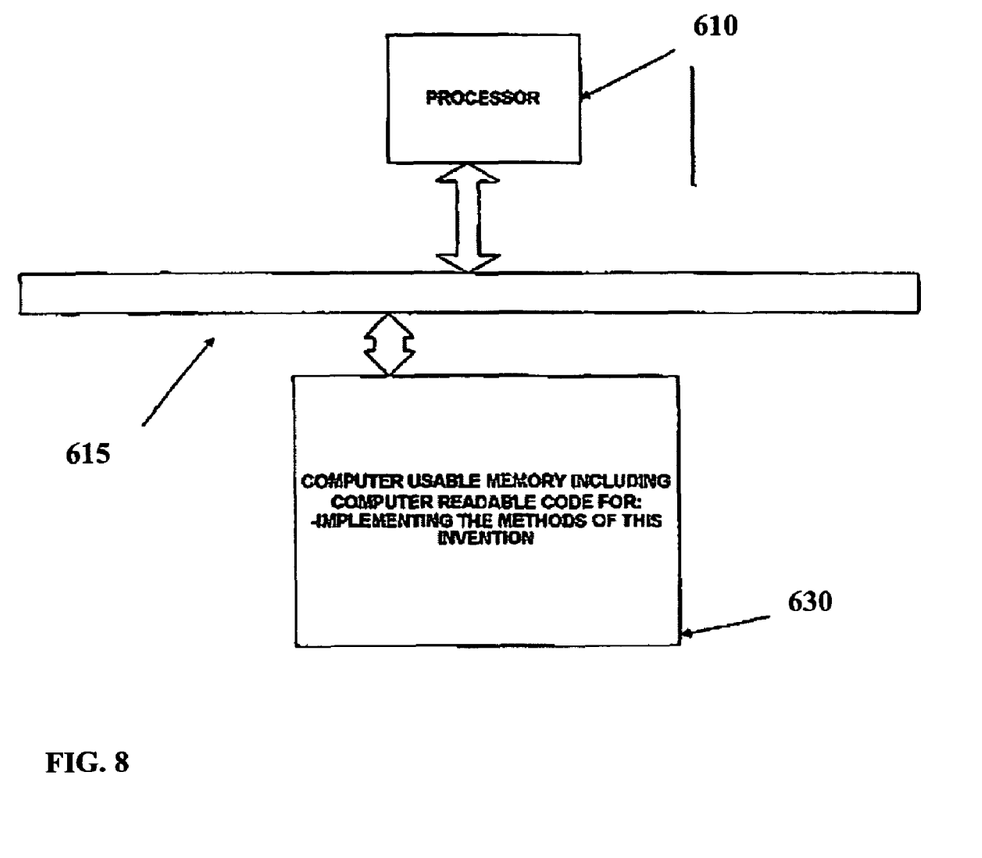
FIG. 8 represents a schematic block diagram representation of a component of the transmitting or receiving system of this invention.

In one embodiment, such as that shown in FIG. 8, the transmitter/receiver control subsystem 450 includes one or more processors, and computer usable media 630 having computer readable code embodied therein capable of causing one or more processors 610 to implement the methods of this invention. The one or more processors 610, the computer usable media 630, and the other components of FIG. 6 are operatively connected by means of a connection component 615 (the connection component may be, for example, a computer bus, or a carrier wave).

Figure 7:
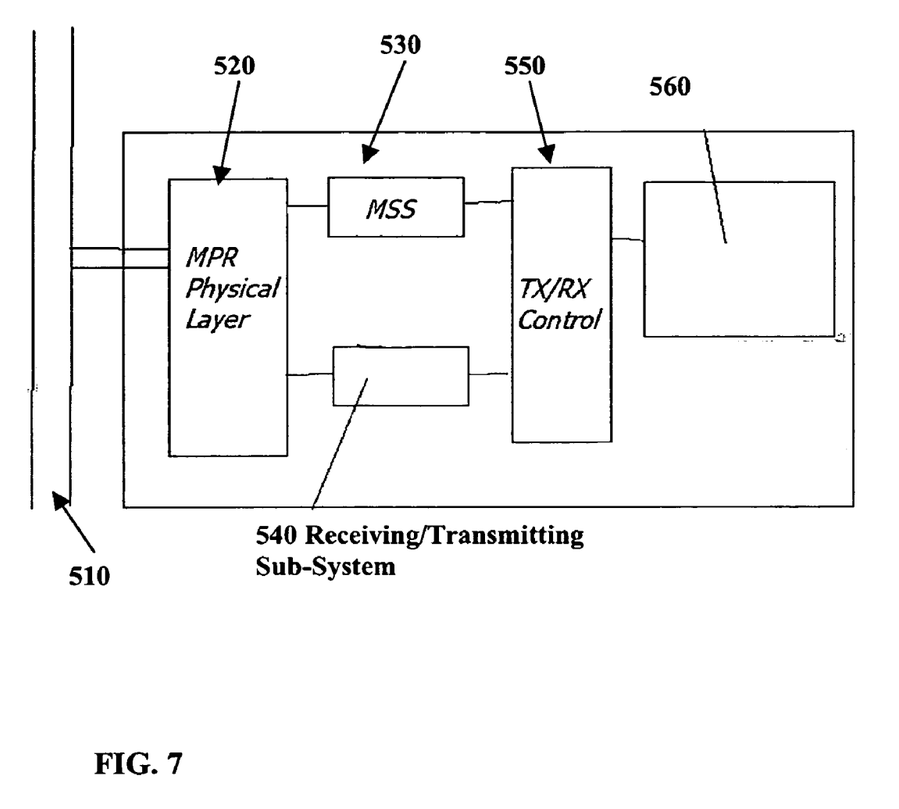
FIG. 7 is a schematic block diagram representation of an embodiment of the receiving system of this invention.

An embodiment of the receiving system of this invention is shown in FIG. 7. Referring to FIG. 7, the embodiment of the receiving system of this invention shown therein includes a monitoring subsystem 530 capable of monitoring a communication channel 510 for transmission, a reception/transmission control subsystem 550 capable of receiving information from the monitoring subsystem 530, of determining whether transmissions are present, of initiating receipt of transmissions, and of determining whether transmissions has been completed, a receiving/transmitting subsystem 540 capable of receiving transmissions and of notifying transmitting nodes of outcome determinations. The receiving/transmitting subsystem 540 is capable of receiving control information from the reception/transmission control subsystem 550 and of receiving determinations of transmissions completion from the reception/transmission control subsystem 550. The receiving/transmitting subsystem 540 is capable of receiving transmissions from the communication channel 510 over a physical layer 520. A module 560 utilizes the received packets. The control subsystem 550 implements the methods of this invention for receiving information, as disclosed hereinabove, in a protocol enabling MPR. The receiving/transmitting subsystem 540 and the monitoring subsystem 530 can be, in one embodiment, but are not limited to being, similar to subsystems used in CSMA without MPR.

In one embodiment, such as that shown in FIG. 8, the control subsystem 550 includes one or more processors 610, and computer usable media 630 having computer readable code embodied therein capable of causing one or more processors 610 to implement the methods of this invention. The one or more processors 610, the computer usable media 630, and the other components of FIG. 7 are operatively connected by means of a connection component 615 (the connection component may be, for example, a computer bus, or a carrier wave).

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program (computer readable code) may be implemented in any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes or other patterns, a RAM, a PROM, and EPROM, a FLASH-EPROM, any other memory chip or cartridge, a carrier wave, such as electromagnetic radiation or electrical signals, or any other medium from which a computer can read.

Although the invention has been described with respect to various embodiments, it should be realized this invention is also capable of a wide variety of further and other embodiments within the spirit and scope of the appended claims.

What is claimed is:

1. A data communication system comprising:
a plurality of terminals connected to a communication channel, each terminal transmitting signals onto said communication channel, and receiving signals transmitted on said communication channel by other terminals, said receiving comprising separating and substantially decoding the signals simultaneously transmitted by multiple other terminals, each terminal comprising:
a monitoring subsystem determining whether signal energy on said communication channel exceeds a predetermined amount;
a component generating and processing network data packets; and
a control subsystem that accepts said network data packets from said component and determines a manner in which to transmit said network data packets over said communication channel; said control subsystem enabling a plurality of said network data packets to be successfully transmitted simultaneously on said communication channel.

2. The data communication system of claim 1 wherein said control subsystem, if it has been determined that said signal energy exceeds said predetermined amount, prevents said each terminal from transmitting onto said communication channel.

3. The data communication system of claim 1, wherein said control subsystem, if it has been determined that said signal energy exceeds said predetermined amount, delays transmission for a backoff duration.

4. The data communication system of claims 3 wherein said backoff duration has a duration of substantially zero.

5. The data communication system of claims 3 wherein said backoff duration is randomly generated.

6. The data communication system of claims 3 wherein said backoff duration is derived from previous backoff durations.

7. The data communication system of claims 3 wherein a slotted-time system is used in said each terminal; and wherein said control subsystem determines said backoff duration and the timing of allowing transmission on said communication channel in relation to a timeslot.

8. The data communication system of claim 1 wherein said monitoring subsystem determines whether an estimate of a number of terminals transmitting simultaneously over the communication channel exceeds a predetermined amount; and, wherein, if it has been determined that said estimate of the number of terminals transmitting simultaneously exceeds said predetermined amount, said control subsystem prevents the terminal from transmitting onto said communication channel.

9. The data communication system of claim 8 wherein said predetermined amount may be derived from the capacity of said channel and the channel state information.

10. The data communication system of claim 8, wherein said monitoring subsystem, if it has been determined that said estimate of the number of terminals transmitting simultaneously exceeds a predetermined amount, further comprises delaying transmission for a backoff duration.

11. The data communication system of claim 10 wherein a slotted-time system is used in said each terminal; and wherein said control subsystem determines said backoff duration and the timing of allowing transmission on said communication channel in relation to a timeslot.

12. The data communication system of claim 10 wherein said backoff duration has a duration of substantially zero.

13. The data communication system of claim 10 wherein said backoff duration is randomly generated.

14. The data communication system of claim 10 wherein said backoff duration is derived from previous backoff durations.

15. The data communication system of claim 1 wherein said control subsystem enables multiple simultaneous transmissions to be present in said communication channel by multiple input multiple output signalling.

16. The data communication system of claim 1 wherein said control subsystem enables multiple simultaneous transmissions to be present in said communication channel by at least one of space-time coding, spread spectrum modulation, frequency hopping or multiple access coding.

17. The data communication system of claim 1 wherein, in said each terminal, said control subsystem further notifies transmitting terminals of successful reception.

18. The data communication system of claim 1 wherein, in said each terminal, said control subsystem determines whether transmission was successful, and if transmission was not successful, initiates retransmission.

19. The data communication system of claim 1 wherein, in said each terminal, said control subsystem modifies a manner in which to transmit in order to improve the probability of successful transmission.

20. The data communication system of claim 19 wherein said modifying the manner in which to transmit in order to improve the probability of successful transmission comprises of adjusting transmit power.

21. The data communication system of claim 19 wherein said modifying manner in which to transmit in order to improve the probability of successful transmission comprises of adjusting transmission parameters to substantially mitigate effects of channel on transmissions.

22. The data communication system of claim 19 wherein said modifying the manner in which to transmit in order to improve the probability of successful transmission comprises deciding the manner in which to transmit over the channel based on at least one of an estimate of a number of terminals currently transmitting on the channel, a relationship between the estimate of the number of terminals currently transmitting over the channel and a capacity of the channel, or details of manners of transmission in which other terminals are currently transmitting over the channel.

23. The data communication system of claim 1 wherein said communication channel comprises a wireless channel.

24. The data communication system of claim 1 wherein said each terminal further comprises a receiving/transmitting subsystem receiving multiple simultaneous transmissions from said communication channel and
wherein said control subsystem of said each terminal determines successful reception of said multiple simultaneous transmissions.

25. The data communication system of claim 24 wherein, in said each terminal, said control subsystem further notifies transmitting terminals of successful reception.

26. A terminal system comprising:
a monitoring subsystem determining whether signal energy on a communication
channel exceeds a predetermined amount;
a component generating and processing network data packets;
control subsystem that accepts said network data packets from said component and determines a manner in which to transmit said network data packets over
said communication channel; and said control subsystem enabling a plurality of said network data packets to be successfully transmitted simultaneously on said communication channel with other data packets transmitted by at least one other terminal and, if it has been determined that said signal energy exceeds said predetermined amount, does not allow the terminal to begin to transmit on said communication channel.

27. The terminal system of claim 26 wherein said control subsystem, if it has been determined that said signal energy exceeds said predetermined amount, prevents the terminal system from transmitting on said communication channel.

28. The terminal system of claim 26 wherein
said control subsystem of said terminal further comprises the receiving of multiple simultaneous transmissions on said communication channel.

29. The terminal system of claim 26 wherein said monitoring subsystem determines whether an estimate of the number of terminals transmitting simultaneously on the communication channel exceeds a predetermined amount; and, if it has been determined that said estimate of the number of terminals transmitting simultaneously exceeds said predetermined amount, said control subsystem prevents the terminal system from transmitting onto said communication channel.

30. The terminal system of claim 29 wherein said predetermined amount is obtained from the capacity of said channel and the channel state information.

31. The terminal system of claim 29, wherein said monitoring subsystem, if it has been determined that said estimate of the number of terminals transmitting simultaneously exceeds the predetermined amount, delays transmission for a backoff duration.

32. The terminal system of claims 31 wherein said backoff duration has a duration of substantially zero.

33. The terminal system of claims 31 wherein said backoff duration is randomly generated.

34. The terminal system of claims 31 wherein said backoff duration is derived from a previous backoff durations.

35. The terminal system of claims 31 wherein a slotted-time system is used in terminal system; and wherein said control subsystem determines said backoff duration and the timing of allowing transmission on said communication channel in relation to a timeslot.

36. The terminal system of claim 26 wherein said control subsystem enables multiple simultaneous transmissions to be present in said communication channel by multiple input multiple output signalling.

37. The terminal system of claim 26 wherein said control subsystem enables multiple simultaneous transmissions to be present in said communication channel by at least one of space-time coding, spread spectrum modulation, frequency hopping or multiple access coding.

38. The terminal system of claim 26 wherein, in said each terminal, the control subsystem modifies a manner in which to transmit in order to improve the probability of successful transmission.

39. The terminal system of claim 38 wherein said modifying manner in which to transmit in order to improve the probability of successful transmission comprises of adjusting parameters in relation to the transmit power.

40. The terminal system of claim 38 wherein said modifying manner in which to transmit in order to improve the probability of successful transmission comprises of adjusting transmission parameters to substantially mitigate effects of channel on transmissions.

41. The terminal system of claim 38 wherein said modifying manner in which to transmit in order to improve the probability of successful transmission comprises deciding the manner in which to transmit over the channel based on at least one of an estimate of a number of terminals currently transmitting on the channel, relationship between the estimate of the number of terminals currently transmitting over the channel and a capacity of the channel, or details of manners of transmission in which other terminals are currently transmitting over the channel.

42. The terminal system of claim 26 wherein said communication channel comprises a wireless channel.

43. The terminal system of claim 26, wherein said control subsystem, if it has been determined that said signal energy exceeds said predetermined amount, delays transmission for a backoff duration.

44. A method for transmitting network data packets, said method comprising the steps of:
sensing a communication channel, by a monitoring subsystem in a terminal, to determine whether signal energy on said communication channel exceeds a predetermined amount; and, if it has been determined that said signal energy exceeds said predetermined amount, said control subsystem prevents the terminal from transmitting on said communication channel;
determining a manner in which to transmit network data packets over said communication channel and enabling a plurality of said network data packets to be transmitted simultaneously on said communication channel, by a control component in the terminal, said plurality of said network data packets being successfully transmitted simultaneously over said communication channel;
transmitting signals, by a transmitting component in the terminal, on said communication channel.

45. The method of claim 44 wherein said sensing step further comprises determining whether an estimate of the number of terminals transmitting simultaneously on the communication channel has been exceeded by a predetermined amount; and wherein, if it has been determined that said estimate of the number of terminals transmitting simultaneously exceeds said predetermined amount, not allowing the terminal to begin to transmit onto said communication channel.

46. The method of claim 44 wherein said predetermined amount is obtained from the capacity of said channel and the channel state information.

47. The method of claim 44 further comprising the steps of:
determining whether transmission was successful; and
if transmission was not successful, retransmitting.

48. The method of claim 44 further comprising the step of modifying manner in which to transmit in order to improve the probability of successful transmission.

49. The method of claim 44 wherein said enabling a plurality of said network data packets to be transmitted simultaneously on said communication channel comprises utilizing multiple input multiple output signalling.

50. The method of claim 44 wherein said enabling a plurality of said network data packets to be transmitted simultaneously on said communication channel comprises utilizing at least one of space-time coding, spread spectrum modulation, frequency hopping or multiple access coding.

51. A data communication system comprising:
a plurality of terminals connected to a communication channel, each terminal transmitting signals onto said communication channel, and receiving signals transmitted on said communication channel by other terminals, said receiving comprising separating and substantially decoding the signals sent simultaneously by multiple other terminals, each terminal comprising:
a monitoring subsystem determining whether signal energy of transmissions on said communication channel exceeds a predetermined amount;
a component generating and processing data packets; and
a control subsystem that accepts said data packets from said component and determines a manner in which to successfully transmit said data packets over said communication channel simultaneously with other data packets transmitted by at least one other terminal and, if it has been determined that said signal energy exceeds said predetermined amount, does not allow the terminal to begin to transmit on said communication channel.

52. The data communication system of claim 51 wherein said control subsystem enables multiple simultaneous transmissions to be present in said communication channel by multiple input multiple output signalling.

53. The data communication system of claim 51 wherein said control subsystem enables multiple simultaneous transmissions to be present in said communication channel by at least one of space-time coding, spread spectrum modulation, frequency hopping or multiple access coding.

54. The data communication system of claim 51, wherein said control subsystem, if it has been determined that said signal energy exceeds said predetermined amount, delays transmission for a backoff duration.

55. The data communication system of claim 51 wherein said communication channel comprises a wireless channel.

56. A terminal system comprising:
a monitoring subsystem determining whether signal energy of transmissions on a communication channel exceeds a predetermined amount, and said monitoring subsystem, if it has been determined that said signal energy exceeds a predetermined amount, does not allow the terminal to begin to transmit on said communication channel;
component generating and processing network data packets; and
a control subsystem that accepts said network data packets from said component and determines a manner in which to transmit said network data packets over said communication channel simultaneously to a plurality of receiving systems; multiple ones of said network data packets transmitted simultaneously over said communication channel being separated and substantially decoded at each receiver from said plurality of receiving systems.

57. The terminal system of claim 56 wherein said control subsystem enables multiple simultaneous transmissions to be present in said communication channel by multiple input multiple output signalling.

58. The terminal system of claim 56 wherein said control subsystem enables multiple simultaneous transmissions to be present in said communication channel by at least one of space-time coding, spread spectrum modulation, frequency hopping or multiple access coding.

59. The terminal system of claim 56, wherein said monitoring subsystem, if it has been determined that said signal energy exceeds said predetermined amount, further comprises delaying transmission for a backoff duration.

60. The terminal system of claim 56 wherein said communication channel comprises a wireless channel.

* * * * *

UNITED STATES PATENT AND TRADEMARK OFFICE
CERTIFICATE OF CORRECTION

PATENT NO.         : 7,839,775 B2                                       Page 1 of 1
APPLICATION NO.    : 11/376067
DATED              : November 23, 2010
INVENTOR(S)        : Douglas S. Chan et al.

It is certified that error appears in the above-identified patent and that said Letters Patent is hereby corrected as shown below:

In column 10, line 1 (claim 4), "claims 3" should read -- claim 3 --
In column 10, line 3 (claim 5), "claims 3" should read -- claim 3 --
In column 10, line 5 (claim 6), "claims 3" should read -- claim 3 --
In column 10, line 8 (claim 7), "claims 3" should read -- claim 3 --
In column 12, line 1 (claim 32), "claims 3" should read -- claim 3 --
In column 12, line 3 (claim 33), "claims 3" should read -- claim 3 --
In column 12, line 5 (claim 34), "claims 3" should read -- claim 3 --
In column 12, line 7 (claim 35), "claims 3" should read -- claim 3 --

Signed and Sealed this
Eighteenth Day of January, 2011

David J. Kappos
*Director of the United States Patent and Trademark Office*